United States Patent
Burton et al.

(10) Patent No.: US 10,275,477 B2
(45) Date of Patent: Apr. 30, 2019

(54) PROCESSING PATH DETERMINATION

(71) Applicant: INTERNATIONAL BUSINESS MACHINES CORPORATION, Armonk, NY (US)

(72) Inventors: Peter H. Burton, Vancouver (CA); Donna K. Byron, Petersham, MA (US); Manvendra Gupta, Brampton (CA)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 15/005,459

(22) Filed: Jan. 25, 2016

(65) Prior Publication Data

US 2017/0212933 A1    Jul. 27, 2017

(51) Int. Cl.

| G06F 17/30 | (2006.01) |
|---|---|
| H04W 40/14 | (2009.01) |
| G05B 13/00 | (2006.01) |
| H04W 40/12 | (2009.01) |

(52) U.S. Cl.
CPC .. G06F 17/30306 (2013.01); G06F 17/30463 (2013.01); G05B 13/00 (2013.01); H04W 40/12 (2013.01); H04W 40/14 (2013.01)

(58) Field of Classification Search
CPC . G06F 17/30463; H04W 40/00; H04W 40/02; H04W 40/04; H04W 40/12; H04W 40/14
USPC ........................................................ 707/716
See application file for complete search history.

(56) References Cited

U.S. PATENT DOCUMENTS

| 6,721,609 | B1* | 4/2004 | Wojsznis | G05B 13/048 |
| | | | | 700/28 |
| 7,783,468 | B2* | 8/2010 | Abu el Ata | G06Q 10/00 |
| | | | | 703/2 |
| 7,945,678 | B1* | 5/2011 | Skene | H04L 45/12 |
| | | | | 709/227 |
| 9,510,357 | B1* | 11/2016 | Egner | H04W 48/18 |
| 2010/0057510 | A1* | 3/2010 | Stevens | G06Q 10/06393 |
| | | | | 705/7.42 |

(Continued)

Primary Examiner — Mark E Hershley
(74) Attorney, Agent, or Firm — Schmeiser, Olsen & Watts; Mark C. Vallone

(57) ABSTRACT

A method and system for automatically determining a processing path is provided. The method includes generating an input criteria associated with performing a hardware apparatus implemented process. Metadata describing the input criteria is generated and stored. Weighting factors associated with the metadata are generated and a specialized hardware apparatus executing the hardware apparatus implemented process is enabled. Measurement characteristics associated with conditions resulting from the specialized hardware apparatus executing the hardware apparatus implemented process are retrieved from a plurality of hardware sensors. A resource database catalog for hardware based data processing resources is queried and an optimization process for determining an optimized processing path for processing the metadata with respect to the resource database hardware based data and the measurement characteristics is executed. The optimized processing path is executed resulting in specified control decisions associated with controlling the specialized hardware apparatus.

18 Claims, 5 Drawing Sheets

(56) References Cited

U.S. PATENT DOCUMENTS

| | | | | |
|---|---|---|---|---|
| 2011/0125509 A1* | 5/2011 | Lidstrom | ............... | G06Q 30/02 |
| | | | | 705/1.1 |
| 2013/0155961 A1* | 6/2013 | Brunnenmeyer | .. | H04B 7/18584 |
| | | | | 370/329 |
| 2013/0306276 A1* | 11/2013 | Duchesneau | ......... | G06F 9/5072 |
| | | | | 165/104.21 |
| 2014/0156806 A1* | 6/2014 | Karpistsenko | .... | H04L 29/06027 |
| | | | | 709/219 |
| 2015/0312824 A1* | 10/2015 | Thalanany | .......... | H04W 36/165 |
| | | | | 455/435.1 |
| 2016/0069624 A1* | 3/2016 | Rollins | ................ | F04D 25/028 |
| | | | | 415/122.1 |
| 2016/0360466 A1* | 12/2016 | Barak | .................... | H04W 8/26 |
| 2017/0221169 A1* | 8/2017 | Champa | ................ | G01C 21/20 |
| 2017/0372332 A1* | 12/2017 | Shachar | ................ | G06Q 30/02 |
| 2018/0058463 A1* | 3/2018 | Rollins | .............. | F04D 25/0606 |

\* cited by examiner

PROCESSING PATH DETERMINATION

FIELD

The present invention relates generally to a method for automatically determining an optimal processing path and in particular to a method and associated system for automatically executing an optimized processing path associated with controlling a specialized hardware apparatus.

BACKGROUND

Determining multiple processes for accomplishing tasks may include a complicated process that may be time consuming. Multiple processes typically result in malfunctions during current activities thereby preventing completion of operational tasks. Accordingly, there exists a need in the art to overcome at least some of the deficiencies and limitations described herein above.

SUMMARY

A first aspect of the invention provides a processing path determination method comprising: generating, by a processor of a specialized hardware device, an input criteria associated with performing a hardware apparatus implemented process; generating, by the processor, metadata describing the input criteria; storing, by the processor, the metadata; generating, by the processor, weighting factors associated with the metadata; enabling, by the processor, a specialized hardware apparatus executing the hardware apparatus implemented process; retrieving, by the processor from a plurality of hardware sensors, measurement characteristics associated with conditions resulting from the specialized hardware apparatus executing the hardware apparatus implemented process; querying, by the processor, a resource database catalog for hardware based data processing resources with respect to the metadata; executing, by the processor, an optimization process for determining an optimized processing path for processing the metadata with respect to the resource database hardware based data and the measurement characteristics; and executing, by the processor, the optimized processing path resulting in specified control decisions associated with controlling the specialized hardware apparatus.

A second aspect of the invention provides a specialized hardware device comprising a computer processor coupled to a computer-readable memory unit, the memory unit comprising instructions that when executed by the computer processor implements a processing path determination method comprising: generating, by the processor, an input criteria associated with performing a hardware apparatus implemented process; generating, by the processor, metadata describing the input criteria; storing, by the processor, the metadata; generating, by the processor, weighting factors associated with the metadata; enabling, by the processor, a specialized hardware apparatus executing the hardware apparatus implemented process; retrieving, by the processor from a plurality of hardware sensors, measurement characteristics associated with conditions resulting from the specialized hardware apparatus executing the hardware apparatus implemented process; querying, by the processor, a resource database catalog for hardware based data processing resources with respect to the metadata; executing, by the processor, an optimization process for determining an optimized processing path for processing the metadata with respect to the resource database hardware based data and the measurement characteristics; and executing, by the processor, the optimized processing path resulting in specified control decisions associated with controlling the specialized hardware apparatus.

A third aspect of the invention provides a computer program product, comprising a computer readable hardware storage device storing a computer readable program code, the computer readable program code comprising an algorithm that when executed by a computer processor of a specialized hardware device implements a processing path determination method, the method comprising: a processing path determination method comprising: generating, by the processor, an input criteria associated with performing a hardware apparatus implemented process; generating, by the processor, metadata describing the input criteria; storing, by the processor, the metadata; generating, by the processor, weighting factors associated with the metadata; enabling, by the processor, a specialized hardware apparatus executing the hardware apparatus implemented process; retrieving, by the processor from a plurality of hardware sensors, measurement characteristics associated with conditions resulting from the specialized hardware apparatus executing the hardware apparatus implemented process; querying, by the processor, a resource database catalog for hardware based data processing resources with respect to the metadata; executing, by the processor, an optimization process for determining an optimized processing path for processing the metadata with respect to the resource database hardware based data and the measurement characteristics; and executing, by the processor, the optimized processing path resulting in specified control decisions associated with controlling the specialized hardware apparatus.

The present invention advantageously provides a simple method and associated system capable of determining multiple processes for accomplishing tasks.

DETAILED DESCRIPTION

Figure 1:
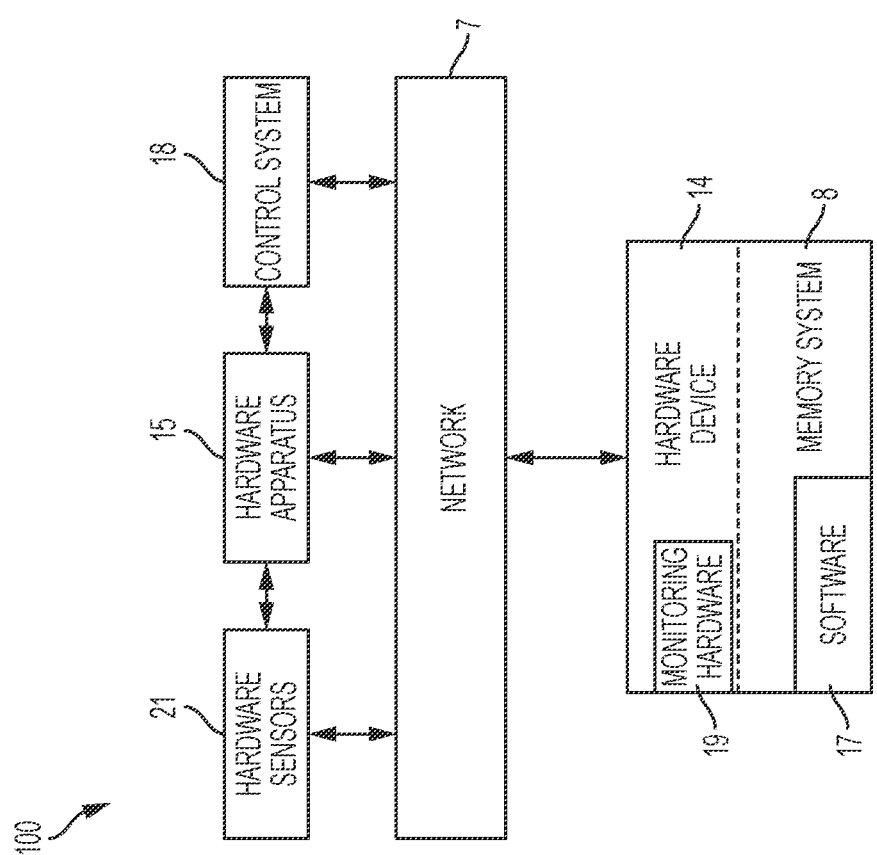
FIG. 1 illustrates a system 100 for generating and executing an optimized processing path associated with controlling a hardware apparatus, in accordance with embodiments of the present invention.

FIG. 1 illustrates a system 100 for generating and executing an optimized processing path associated with controlling a hardware apparatus 15, in accordance with embodiments of the present invention. System 100 enables a method for optimizing data processing within a given hardware implemented system based on input criteria and learned characteristics of the system during runtime. The input criteria provides system guidance with respect to determining an optimized processing path and available data sources. The input criteria is configured to provide guidance to determine the following characteristics:

1. A most cost effective processing path and associated data sources.
2. A quickest processing path or data sources.
3. A processing path or data source providing highest quality results.

System allows internal hardware and software modifications to enable the above characteristics. The input criteria provide a weighting of importance for each of the characteristics (i.e., cost, time, and quality) that govern data processing. For example, an input criteria associated with a least expensive processing path delivers results comprising minimal costs while an input criteria associated with a fastest path delivers results in a shorted timeframe. Likewise, an input criteria associated with a highest quality path delivers a highest quality path.

System 100 enables dynamic resource adjustment within an IT system in order to balance cost, time, and quality during data processing, in accordance to input criteria specified by a user. The input criteria is defined using an extensible metadata model and provided as input to system 100 to dynamically govern the processing of data.

System 100 includes a hardware device 14 (e.g., a specialized embedded hardware device) communicatively connected to a hardware apparatus 15, a control system 18, and hardware sensors 21 through a network 7. Additionally, hardware apparatus 15 is connected to hardware sensors 21 and control system 18. Hardware device 14 comprises monitoring hardware and software 17 (located in a memory system 8). Mobile device 108 comprises a cache handler hardware component 108a and a cache database component 108b (e.g., specialized non-generic integrated circuits). Hardware device 14, hardware apparatus 15, and control system 18 may each comprise a specialized hardware device comprising specialized (non-generic) hardware and circuitry (i.e., specialized discrete non-generic analog, digital, and logic based circuitry) for executing the process described with respect to FIGS. 1-5. The specialized discrete non-generic analog, digital, and logic based circuitry may include proprietary specially designed components (e.g., a specialized integrated circuit designed for only implementing an automated process for generating and executing an optimized processing path associated with controlling a hardware apparatus). Hardware sensors 21 may comprise any type of hardware sensor for measuring characteristics associated with operation of hardware apparatus 15 such as, inter alia, temperature sensors, pressure sensors, vibration sensors, moisture sensors, power level detection circuitry, GPS sensors, etc. Control system 18 is configured to enable hardware apparatus based on an optimized processing path determined by hardware device based on analyzed characteristics retrieved from hardware sensors 21. Additionally, monitoring hardware 19 may be enabled by hardware device 14 to measure characteristics associated with operation of hardware apparatus 15 and/or operation of hardware device 14. Likewise, monitoring hardware 19 may comprise any type of hardware monitoring device such as, inter alia, temperature sensors, pressure sensors, vibration sensors, moisture sensors, power level detection circuitry, GPS sensors, etc. Memory system 8 may include a single memory system. Alternatively, the memory system 8 may include a plurality of memory systems comprising multiple internal and external databases. Network 7 may include any type of network including, inter alia, a local area network, (LAN), a wide area network (WAN), the Internet, a wireless network, etc.

System 100 enables the following implementation example with respect to determining an optimized processing path associated with controlling hardware apparatus 15 with respect to the aforementioned components:

In the following example, hardware sensors 21 comprise sensors installed within ball bearings comprised by a deep earth drilling device (e.g., hardware apparatus 15). The sensors are configured to measure characteristics such as, pressure, heat, and vibrations. The sensors may comprise built in logic circuitry to correct error conditions impacting a number of sensor readings transmitted by the sensors. Alternatively, all sensor readings may be transmitted to an analytics system (e.g., hardware device 14) to perform error checks (e.g., remove noise, remove boundary conditions, etc.) thereby allowing the analytics system to collect data faster and use much more computing capacity to enable decisions associated with controlling the deep earth drilling device.

The following process describes a process for applying optimization processes to determine an optimized processing path.

The process is initiated in response to a data processing resource catalog database query comprising a historic performance of the components in the data processing resource catalog with respect to a quality of service delivered such as latency, fidelity, cost (e.g., financial transaction charges, a number of processors used, an amount of server space required, a number of sensors, a network bandwidth required, etc.). The data processing resource catalog may be populated by users of system 100 or providers of services. Alternatively, the data processing resource catalog may be populated automatically via observation of past system behavior. Customer input criteria associated with the optimization process is converted into a cost function for an optimization routine. For example, a cost function may be expressed as a fitness function evaluated to generate a fitness score comprising a large number representing an adequate solution. The customer input criteria may be expressed as a combination such as, inter alia:

1. Min cost
2. Min cost with latency at most N
3. Min latency with cost at most Y An associated optimization process is selected based on a need for the optimization process to be executed quickly. For example, when a customer service representative is on the phone with a mobile phone customer requesting details regarding service options, the optimization process must execute quickly. In this case, a sampling/inference based optimization process may be employed. Alternatively with respect to a manufacturing or IT provisioning scenario where the optimization process is being executed offline and enables more time to complete, the optimization process may be selected such that all possible options are analyzed to create a globally optimal solution. The following scenarios associated with data processing resource catalog size are implemented.

Scenario 1

A data processing resource catalog comprises a manageable size associated with all possible combinations being enumerated. Therefore, a deterministic optimization process (e.g., linear programming) is utilized. Linear programming enables an optimization process by determining a maximum setting for a set of variables thereby determining an overall cost via utilization of a vector of know coefficients.

Scenario 2

A data processing resource catalog comprises a large sixe associated with exhaustive exploration. Therefore, a heuristic technique (e.g., a particle swarm, genetic algorithms, a simulated annealing) is utilized. The aforementioned techniques require calculating cost/fitness for each proposed solution (i.e., calculating cost/latency/quality attributes and comparing the attributes to a customer requirement). The proposed solutions are iterated for N number of iterations, thereby removing the best solutions from prior iterations. The optimization process is disabled after N iterations or if there is little improvement in the proposed solution over specified iterations. An optimization process (i.e., as described with respect to step 218 of FIG. 2, infra) may be executed as follows:

1. Determine an allowable runtime for the optimization process and an expected runtime for a deterministic optimization process. If the expected runtime is greater than the allowable runtime then a heuristic optimization process is selected. If the expected runtime is less than the allowable runtime then a deterministic process is selected.
2. Render customer requirements into a cost function or parameter vector for the selected process. If a heuristic process is selected, a maximum runtime is set to halt and a current best proposed solution is selected.
3. A selected process is executed until convergence is achieved or a halting time is reached.
4. The system is configured with a selected for execution.

Figure 2:
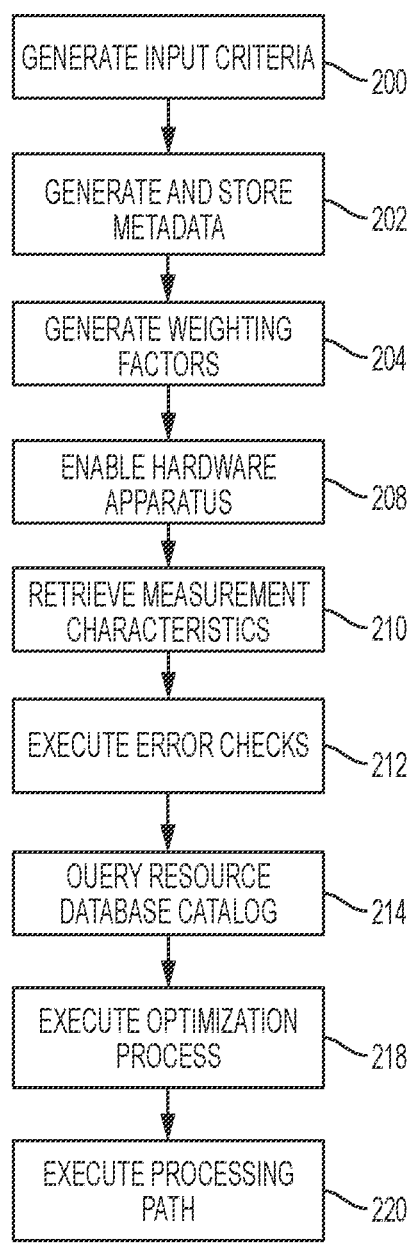
FIG. 2 illustrates an algorithm detailing a flow of steps enabled by the system of FIG. 1 for generating and executing an optimized processing path associated with controlling a hardware apparatus, in accordance with embodiments of the present invention.

FIG. 2 illustrates an algorithm detailing a method for generating and executing an optimized processing path associated with controlling the hardware apparatus 15 of FIG. 1, in accordance with embodiments of the present invention. Each of the steps in the algorithm of FIG. 2 may be enabled and executed by a computer processor executing computer code. In step 200, an input criteria associated with performing a hardware apparatus implemented process is generated by a specialized hardware device. The input criteria may comprise cost criteria, a time based criteria, a quality based criteria, etc. In step 202, metadata describing the input criteria is generated and stored. In step 204, weighting factors are generated and applied to the metadata. In step 208, a specialized hardware apparatus executing the hardware apparatus implemented process is enabled. In step 210, measurement characteristics associated with conditions resulting from the specialized hardware apparatus executing the hardware apparatus implemented process are retrieved from a plurality of hardware sensors. The measurement characteristics may comprise, inter alia, pressure related characteristics, heat related characteristics, vibration related characteristics, etc. In step 212, error checks are executed with respect to the measurement characteristics. The error checks may be associated with noise related errors, boundary condition errors, etc. In step 214, a resource database catalog is queried for hardware based data processing resources with respect to the metadata. The hardware based data processing resources may be associated with historical performance attributes including, inter alia, a number of processors used, an amount of server space required, a number of sensors used, a required network bandwidth, etc. In step 218, an optimization process for determining an optimized processing path for processing the metadata with respect to the resource database hardware based data and measurement characteristics is determined. The optimization process may include the following steps:

1. Determining an allowable runtime for the optimization process.
2. Determining an expected runtime for the optimization process.
3. Comparing a value for the allowable runtime to a value for the expected runtime.
4. Determining if the value for the expected runtime is greater than the value for the allowable runtime. If it is determined that the value for the expected runtime is greater than the value for the allowable runtime, then a heuristic optimization process is executed resulting in a maximum runtime for halting the heuristic optimization process is set and the heuristic optimization process is executed upon reaching the maximum runtime. If it is determined that the value for the expected runtime is less than the value for the allowable runtime, then a deterministic optimization process is executed.
5. Selecting a specialized optimization process based on results of the determining of step 4.
6. Executing specified requirements with respect to a cost function or a parameter vector with respect to the specialized optimization process resulting from the selection of step 5.

In step 220, the optimized processing path is executed resulting in specified control decisions associated with controlling the specialized hardware apparatus.

Figure 3:
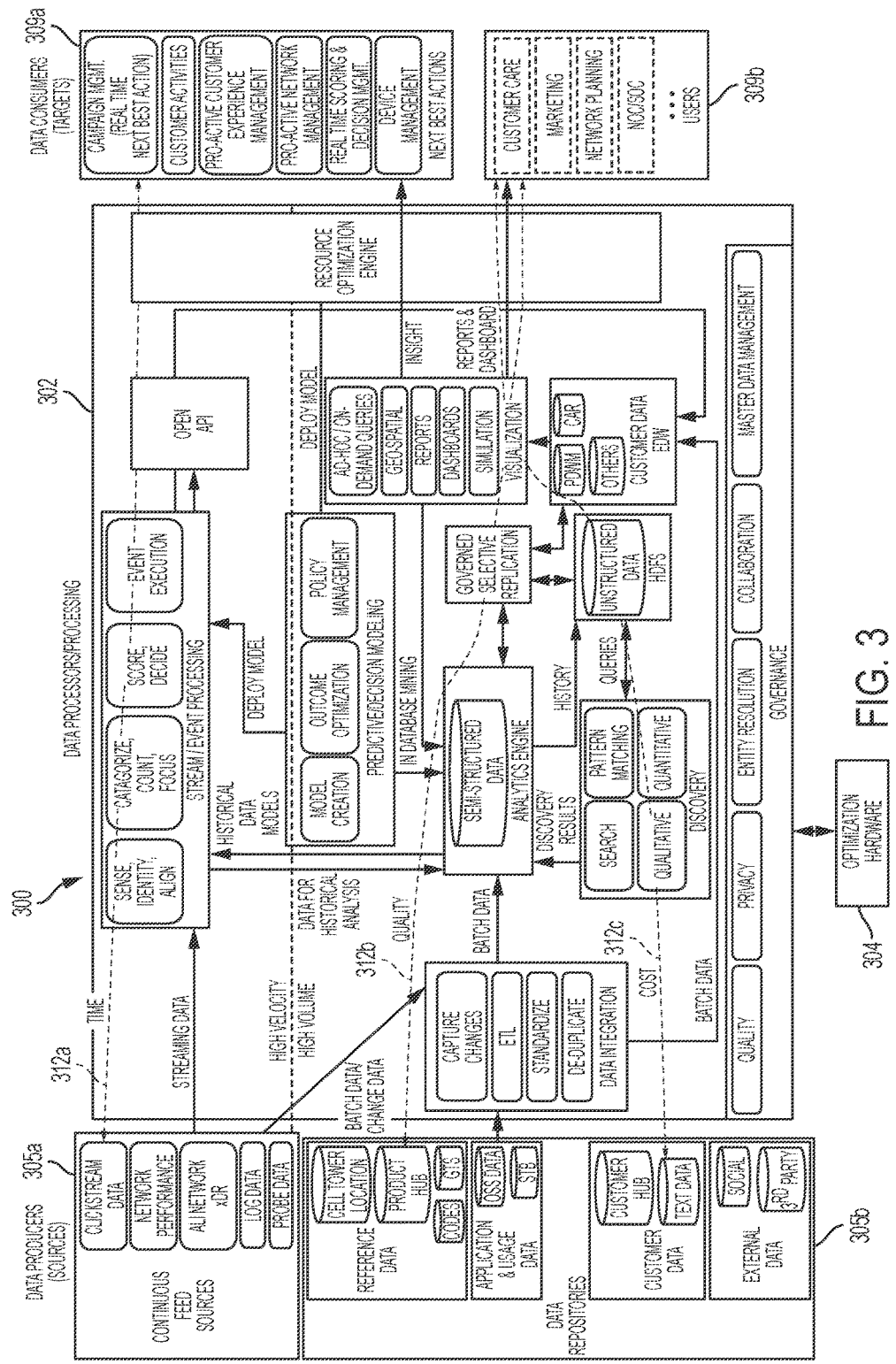
FIG. 3 illustrates a system for implementing telecom architecture with respect to generating and executing an optimized processing path associated with controlling the hardware apparatus of FIG. 1, in accordance with embodiments of the present invention.

FIG. 3 illustrates architecture 300 for implementing a telecom system 302 with respect to data processing and management, in accordance with embodiments of the present invention. System 302 includes resource optimization hardware 404 and an associated optimization engine 404b (i.e., as described with respect to FIG. 4, infra) for generating and executing an optimized processing path associated with controlling the hardware apparatus 15 of FIG. 1. Architecture 300 comprises telecom (data processing and management) system 302, optimization hardware 304, data sources 305a and 305b, and data targets 309a and 309b. Architecture 300 comprises an example of a resource optimization process within a data processing system governed by weighted criteria for cost, time, and quality. Architecture 300 is enabled to capture and apply weighted criteria used to determine a most optimized path through a data processing system to provide the results back to a consuming system or user. Telecom (data processing and management) system 302 provides resource optimized data processing paths 312a, 312b, and 312c, given weighted input derived from specific service level agreements. Optimization hardware enables a resource optimization process.

Figure 4:
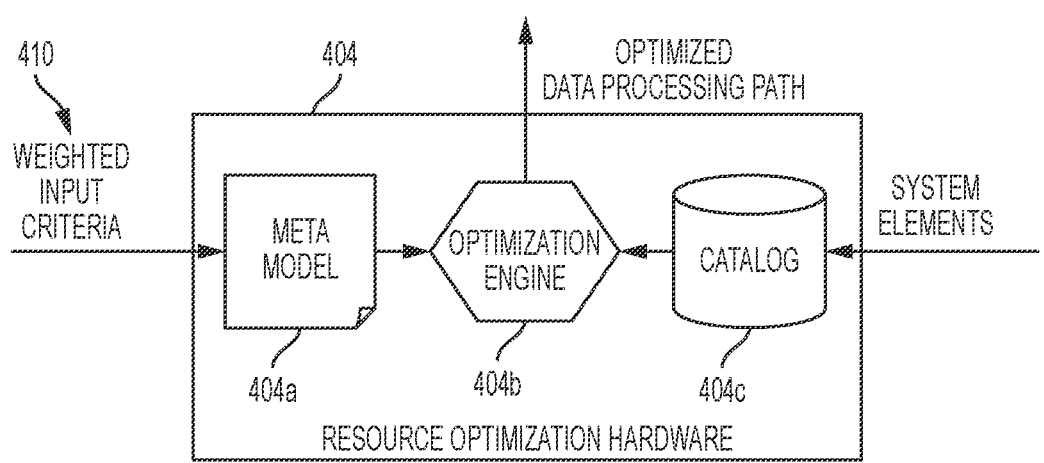
FIG. 4 illustrates an internal view of optimization hardware, in accordance with embodiments of the present invention.

FIG. 4 illustrates an internal view of optimization hardware 404, in accordance with embodiments of the present invention. Resource optimization hardware 404 comprises an extensible metadata model 404a defining weighted criteria, a catalog database 404c storing and scoring all elements in a given data processing system, and an optimization engine 404b (comprising specialized hardware such as, specialized (non-generic) hardware and circuitry (i.e., specialized discrete non-generic analog, digital, and logic based circuitry) for executing the process described with respect to FIGS. 1-4. Optimization hardware 404 receives weighted input criteria 410 defined using an extensible metadata model. Optimization algorithms executed by optimization hardware 404 determines an appropriate location(s) for requested data and an optimized path through a data processing system to return a required result for a consuming system or user. An example of weighted input criteria is as follows:

| Request | Cost | Time | Quality |
|---|---|---|---|
| Customer Record | 2 | 3 | 5 |

1 = lowest emphasis (weighting).
5 = highest emphasis (weighting).

The above example illustrates a greatest emphasis is being placed on a quality factor weighting of 5, a time factor weighting of 3, and a cost factor weighting of 2. Therefore, it is determined that a user is willing to pay a higher cost for a highest quality of data and less consideration is given to a time for obtaining the data and associated costs.

Resource optimization hardware 404 maintains an internal catalog (catalog database 404c) comprising all known elements within a data processing system (e.g., sources, stores, movement, analytics, etc.). The internal catalog records attributes regarding costs, latency/time, and quality for each element. Each attribute is assigned a value based on an associated element's propensity to deliver the attribute. For example, a catalog may comprise the following entries:

| System Element | Element Name/ID | Cost | Time | Quality |
|---|---|---|---|---|
| Source | Customer MDM | 5 | 4 | 1 |
| Source | Customer ODS | 3 | 3 | 3 |
| Source | CRM | 1 | 2 | 5 |
| Store | Hadoop | 2 | 3 | 3 |
| Store | Analytics Warehouse | 5 | 2 | 2 |
| Movement | Streams | 4 | 1 | 3 |
| Movement | ETL | 2 | 3 | 2 |
| Analytics | Cognos | 3 | 2 | 2 |
| Analytics | Excel | 1 | 4 | 4 |

1 = Most positive (e.g., low cost, short time, high quality).
5 = Most negative (e.g., high cost, long time, low quality).

The above entries specify that cost and time comprise an objective value and quality comprises a subjective value. Resource optimization hardware 404 specifies a veracity factor as a measure of quality. Veracity techniques may be applied to improve a quality of data. For example, veracity techniques may include data cleansing, data validation, and data integrity checking. Resource optimization hardware 404 applies sophisticated optimization logic to select the most appropriate system elements and derive a most optimized processing path using the selected system elements to provide a consuming system or user with expected results in accordance with defined service level agreements.

Figure 5:
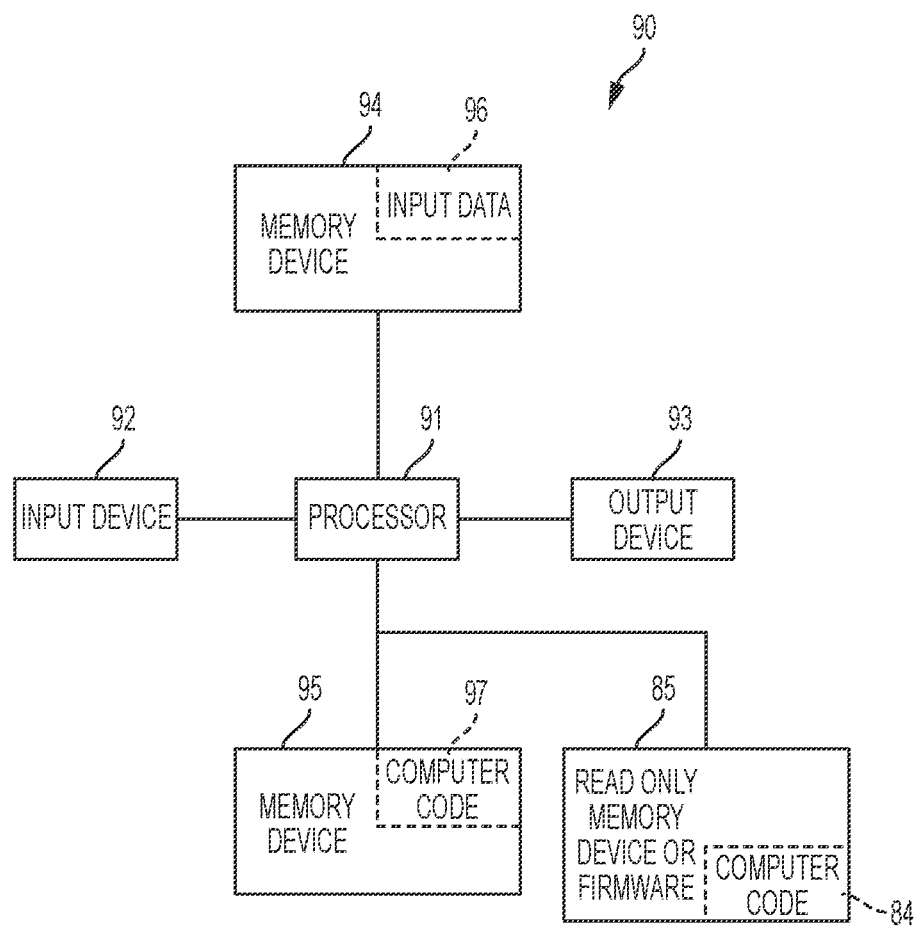
FIG. 5 illustrates a computer system used by or comprised by the system of FIG. 1 for enabling a process for generating and executing an optimized processing path associated with controlling a hardware apparatus, in accordance with embodiments of the present invention.

FIG. 5 illustrates a computer system 90 (e.g., hardware apparatus 15, control system 18, and hardware device 14 of FIG. 1) used by or comprised by the system of FIG. 1 for enabling a process for generating and executing an optimized processing path associated with controlling a hardware apparatus, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational activities to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIG. 4) for enabling a process for updating commonly used data in a data cache of mobile devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 85) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 4) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to generate and execute an optimized processing path associated with controlling a hardware apparatus. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for generating and executing an optimized processing path associated with controlling a hardware apparatus. In another embodiment, the invention provides a business method that performs the process activities of the invention on a subscription, advertising, and/or fee basis. That is, a service supplier, such as a Solution Integrator, could offer to enable a process for generating and executing an optimized processing path associated with controlling a hardware apparatus. In this case, the service supplier can create, maintain, support, etc. a computer infrastructure that performs the process activities of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a specialized configuration of hardware (that may include specialized circuitry) and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A processing path determination method comprising:
generating, by a processor of a specialized hardware device, an input criteria associated with performing a hardware apparatus implemented process;
generating, by said processor, metadata describing said input criteria;
storing, by said processor, said metadata;
generating, by said processor, weighting factors associated with said metadata;
enabling, by said processor, a specialized hardware apparatus executing said hardware apparatus implemented process, wherein said specialized hardware apparatus comprises an electromechanical device;
retrieving, by said processor from a plurality of hardware sensors installed within bearings of said electromechanical device, measurement characteristics associated with conditions resulting from said specialized hardware apparatus executing said hardware apparatus implemented process, wherein said measurement characteristics comprise pressure related characteristics, heat related characteristics, and vibration related characteristics associated with movement of said components of said electromechanical device, and wherein said plurality of hardware sensors comprise built in logic circuitry to correct error conditions impacting a number of sensor readings transmitted by the hardware sensors;
querying, by said processor, a resource database catalog for hardware based data processing resources with respect to said metadata;
executing, by said processor, an optimization process for determining an optimized processing path for processing said metadata with respect to said resource database hardware based data and said measurement characteristics; and
executing, by said processor, said optimized processing path resulting in specified control decisions associated with controlling movement based functions of said specialized hardware apparatus.

2. The method of claim 1, wherein said input criteria comprises cost criteria, a time based criteria, and a quality based criteria.

3. The method of claim 1, further comprising:
executing, by said processor, error checks with respect to said measurement characteristics.

4. The method of claim 1, wherein said error checks are associated with errors selected from the group consisting of noise related errors and boundary condition errors.

5. The method of claim 1, wherein said hardware based data processing resources are associated with historical performance attributes selected from the group consisting of a number of processors used, an amount of server space required, a number of sensors, and a required network bandwidth.

6. The method of claim 1, wherein said optimization process comprises:
determining an allowable runtime for said optimization process;
determining an expected runtime for said optimization process;
comparing a value for said allowable runtime to a value for said expected runtime;
determining if said value for said expected runtime is greater than said value for said allowable runtime; and
selecting a specialized optimization process based on results of said determining if said value for said expected runtime is greater than said value for said allowable runtime.

7. The method of claim 6, further comprising:
executing specified requirements with respect to a cost function or a parameter vector with respect to said specialized optimization process resulting from said selecting.

8. The method of claim 7, wherein it is determined that said value for said expected runtime is greater than said value for said allowable runtime, and wherein said specialized optimization process comprises a executing a heuristic optimization process, and wherein said method further comprises:
setting a maximum runtime for halting said optimization process; and
executing, based on reaching said maximum runtime, said heuristic optimization process.

9. The method of claim 7, wherein it is determined that said value for said expected runtime is not greater than said value for said allowable runtime, and wherein said specialized optimization process comprises a executing a deterministic optimization process, and wherein said method further comprises:
executing said deterministic optimization process.

10. The method of claim 1, further comprising:
providing at least one support service for at least one of creating, integrating, hosting, maintaining, and deploying computer-readable code in the computing system, said code being executed by the computer processor to implement: said generating said input criteria, said generating said metadata, said storing, said generating said weighting factors, said enabling, said retrieving, said querying, said executing said optimization process, and said executing said associated processing path.

11. A specialized hardware device comprising a computer processor coupled to a computer-readable memory unit, said memory unit comprising instructions that when executed by the computer processor implements a processing path determination method comprising:
generating, by said processor, an input criteria associated with performing a hardware apparatus implemented process;
generating, by said processor, metadata describing said input criteria;
storing, by said processor, said metadata;
generating, by said processor, weighting factors associated with said metadata;
enabling, by said processor, a specialized hardware apparatus executing said hardware apparatus implemented process, wherein said specialized hardware apparatus comprises an electromechanical device;
retrieving, by said processor from a plurality of hardware sensors installed within bearings of said electromechanical device, measurement characteristics associated with conditions resulting from said specialized hardware apparatus executing said hardware apparatus implemented process, wherein said measurement characteristics comprise pressure related characteristics, heat related characteristics, and vibration related characteristics associated with movement of said components of said electromechanical device, and wherein said plurality of hardware sensors comprise built in logic circuitry to correct error conditions impacting a number of sensor readings transmitted by the hardware sensors;

querying, by said processor, a resource database catalog for hardware based data processing resources with respect to said metadata;

executing, by said processor, an optimization process for determining an optimized processing path for processing said metadata with respect to said resource database hardware based data and said measurement characteristics; and executing, by said processor, said optimized processing path resulting in specified control decisions associated with controlling movement based functions of said specialized hardware apparatus.

12. The specialized hardware device of claim 11, wherein said input criteria comprises cost criteria, a time based criteria, and a quality based criteria.

13. The specialized hardware device of claim 11, wherein said method further comprises:

executing, by said processor, error checks with respect to said measurement characteristics.

14. The specialized hardware device of claim 11, wherein said error checks are associated with errors selected from the group consisting of noise related errors and boundary condition errors.

15. The specialized hardware device of claim 11, wherein said hardware based data processing resources are associated with historical performance attributes selected from the group consisting of a number of processors used, an amount of server space required, a number of sensors, and a required network bandwidth.

16. The specialized hardware device of claim 11, wherein said optimization process comprises:

determining an allowable runtime for said optimization process;

determining an expected runtime for said optimization process;

comparing a value for said allowable runtime to a value for said expected runtime;

determining if said value for said expected runtime is greater than said value for said allowable runtime; and selecting a specialized optimization process based on results of said determining if said value for said expected runtime is greater than said value for said allowable runtime.

17. The specialized hardware device of claim 16, wherein said method further comprises:

executing specified requirements with respect to a cost function or a parameter vector with respect to said specialized optimization process resulting from said selecting.

18. A computer program product, comprising a computer readable hardware storage device storing a computer readable program code, said computer readable program code comprising an algorithm that when executed by a computer processor of a specialized hardware device implements a processing path determination method, said method comprising:

generating, by said processor, an input criteria associated with performing a hardware apparatus implemented process;

generating, by said processor, metadata describing said input criteria;

storing, by said processor, said metadata;

generating, by said processor, weighting factors associated with said metadata;

enabling, by said processor, a specialized hardware apparatus executing said hardware apparatus implemented process, wherein said specialized hardware apparatus comprises an electromechanical device;

retrieving, by said processor from a plurality of hardware sensors installed within bearings of said electromechanical device, measurement characteristics associated with conditions resulting from said specialized hardware apparatus executing said hardware apparatus implemented process, wherein said measurement characteristics comprise pressure related characteristics, heat related characteristics, and vibration related characteristics associated with movement of said components of said electromechanical device, and wherein said plurality of hardware sensors comprise built in logic circuitry to correct error conditions impacting a number of sensor readings transmitted by the hardware sensors;

querying, by said processor, a resource database catalog for hardware based data processing resources with respect to said metadata;

executing, by said processor, an optimization process for determining an optimized processing path for processing said metadata with respect to said resource database hardware based data and said measurement characteristics; and executing, by said processor, said optimized processing path resulting in specified control decisions associated with controlling movement based functions of said specialized hardware apparatus.

* * * * *